United States Patent
Eckardt et al.

(10) Patent No.: US 6,356,613 B1
(45) Date of Patent: Mar. 12, 2002

(54) APPARATUS FOR THE RECOMBINATION OF HYDROGEN IN A GAS MIXTURE

(75) Inventors: Bernd Eckardt, Bruchköbel; Axel Hill, Stockstadt, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/370,249

(22) Filed: Aug. 9, 1999

Related U.S. Application Data

(63) Continuation of application No. PCT/EP98/00430, filed on Jan. 27, 1998.

(30) Foreign Application Priority Data

Feb. 7, 1997 (DE) .......................................... 197 04 608

(51) Int. Cl.$^7$ ................................................. G21C 9/06
(52) U.S. Cl. ....................... 376/301; 376/300; 422/211; 423/580.1; 423/645; 431/328; 431/346
(58) Field of Search ................................ 376/300, 301; 431/346, 328; 422/211; 423/645, 580.1

(56) References Cited

U.S. PATENT DOCUMENTS

| | | | | |
|---|---|---|---|---|
| 2,403,188 A | * | 7/1946 | McCollum .................... 158/28 |
| 2,420,599 A | * | 5/1947 | Jurs ............................. 48/192 |
| 2,945,794 A | * | 7/1960 | Winters et al. ........... 204/154.2 |
| 3,660,041 A | * | 5/1972 | Moore et al. ................. 23/262 |
| 3,679,373 A | * | 7/1972 | Hartman, Jr. et al. ....... 376/300 |
| 3,807,940 A | * | 4/1974 | Juricek ....................... 431/346 |
| 3,865,555 A | * | 2/1975 | Elebracht et al. .......... 23/288 R |
| 3,892,519 A | * | 7/1975 | Reed et al. .................. 431/202 |
| 4,067,190 A | * | 1/1978 | Hamm et al. ............. 60/39.69 A |
| 4,082,497 A | * | 4/1978 | Crawford et al. ........... 431/158 |
| 4,226,675 A | * | 10/1980 | Lewis et al. ............... 176/19 R |
| 4,228,132 A | | 10/1980 | Weems et al. .............. 422/174 |
| 4,288,211 A | * | 9/1981 | Bodenbenner et al. ...... 431/346 |
| 4,374,649 A | * | 2/1983 | Rao ............................. 48/192 |
| 4,631,164 A | * | 12/1986 | Heck ........................... 376/300 |
| 4,741,879 A | * | 5/1988 | McLean et al. ............. 376/301 |
| 4,780,271 A | * | 10/1988 | Dezubay et al. ............ 376/300 |
| 4,842,811 A | * | 6/1989 | Desilva ....................... 376/301 |
| 4,911,879 A | | 3/1990 | Heck et al. .................. 376/301 |
| 5,017,331 A | * | 5/1991 | Eckhardt ..................... 376/313 |
| 5,167,908 A | | 12/1992 | Chakraborty ............... 376/301 |
| 5,230,859 A | | 7/1993 | Wiesemes ................... 376/301 |
| 5,301,217 A | * | 4/1994 | Heck et al. .................. 376/301 |
| 5,321,730 A | | 6/1994 | Eckardt ....................... 376/301 |
| 5,492,686 A | * | 2/1996 | Hill ........................... 423/580.1 |
| 5,518,697 A | * | 5/1996 | Dalla Betta et al. ......... 422/173 |
| 5,641,282 A | * | 6/1997 | Lee et al. ....................... 431/7 |
| 5,718,573 A | * | 2/1998 | Knight et al. ............... 431/354 |
| 6,074,882 A | * | 6/2000 | Eckhardt ..................... 436/147 |

FOREIGN PATENT DOCUMENTS

| | | | | |
|---|---|---|---|---|
| DE | 37 27 207 A1 | | 2/1989 | ............ G21C/9/00 |
| DE | 40 15 228 A1 | | 11/1991 | ............ C01B/3/58 |
| DE | 44 28 956 C1 | | 8/1996 | ............ B01J/35/02 |
| EP | 0 388 955 A2 | | 9/1990 | ......... G21C/19/317 |
| EP | 0 416 140 A1 | | 3/1991 | ............ G21C/9/06 |
| EP | 0 436 942 A2 | | 7/1991 | ............ B01D/53/36 |
| JP | 0060411 | * | 4/1985 | ............ F23D/11/40 |
| WO | WO-9716832 | * | 5/1997 | ............ G21C/9/06 |

* cited by examiner

*Primary Examiner*—Michael J. Carone
*Assistant Examiner*—John Richardson
(74) *Attorney, Agent, or Firm*—Herbert L. Lerner; Laurence A. Greenberg; Werner H. Stemer

(57) ABSTRACT

An apparatus for the recombination of hydrogen in a gas mixture, in particular for a nuclear power station, during the operation of which unintentional ignition of the gas mixture is avoided in a particularly reliable way. The apparatus contains a catalyst configuration that is disposed in a housing through which the gas mixture can flow by free convection in the operating situation and the catalyst configuration is assigned a flame retention device. In this case, a sediment trap is preferably integrated into the flame retention device, so that hot catalyst particles that become detached from the catalyst configuration are reliably prevented from flowing out counter to the direction of flow of the gas mixture.

22 Claims, 3 Drawing Sheets

APPARATUS FOR THE RECOMBINATION OF HYDROGEN IN A GAS MIXTURE

CROSS-REFERENCE TO RELATED APPLICATION

This is a continuation of copending International Application PCT/EP98/00430, filed Jan. 27, 1998, which designated the United States.

BACKGROUND OF THE INVENTION

Field of the Invention

The invention relates to an apparatus for the recombination of hydrogen in a gas mixture, in particular for a nuclear power station.

In a nuclear power station, if there are situations in which an incident or accident occurs, however unlikely these may be, oxidation of zirconium could occur, for example, due to the heating of the core. In this case, the formation and release of hydrogen gas and carbon monoxide within the safety vessel or containment enclosing the reactor core must be expected. Explosive gas mixtures may consequently be generated within the containment.

Various devices or methods are under discussion for preventing the formation of explosive gas mixtures of this kind in the containment of a nuclear power station. These include, for example, devices, such as catalytic recombinators, catalytically and electrically operated ignition devices or the combination of the two devices mentioned above as well as methods for permanently or subsequently inertizing the containment.

When a catalytic recombinator is used for eliminating hydrogen from the atmosphere of the containment, early flameless recombination of hydrogen with oxygen is to be achieved in particular. In this case, a significant pressure build-up as a consequence of virulent hydrogen combustion is to be reliably avoided. An early-starting recombination device suitable for this purpose, which, even when dwelling for a relatively long time in the containment atmosphere, does not lose activity to any appreciable extent and starts passively at low ambient temperatures, is proposed in earlier, commonly assigned German Patent Application 196 36 557.0. By use of a recombination device of this type, "smooth" recombination of hydrogen in a, for example, steam-inertized phase of the containment atmosphere, without ignition, is possible. A catalyst system for the recombination of hydrogen with oxygen is also known from U.S. Pat. No. 5,167,908.

Published, European Patent Application EP 0 436 942 A1 discloses a recombinator system with a housing protection device which opens automatically as a function of an external temperature.

By contrast, in a state of readiness of the recombination system, the housing protection device is closed, so as to avoid the catalytically active surface of the recombinator being contaminated.

By contrast, in a recombinator device known from Published, European Patent Application EP 0 416 140 A1, filter media are provided, which retain the pollutants from the ambient atmosphere, such as, for example, aerosols, and thus protect the catalyst of the recombinator device against contamination.

Published, European Patent Application EP 0 388 955 A1 discloses a recombinator device, in which an ignition device is additionally provided for triggering controlled hydrogen combustion.

Every known recombinator system is configured for a particularly high recombinator capacity, along with particularly small component dimensions, and for high resistance to contamination. However, to use an apparatus for the recombination of hydrogen in a gas mixture in a nuclear power station, it is also necessary, furthermore, to ensure that no effects adversely influencing the safety of the nuclear power station can occur. It must be remembered that a catalyst configuration used for the recombination of hydrogen normally heats up as a result of recombination and, on account of its increased temperature, could contribute unintentionally to ignition of the gas mixture within the containment atmosphere of the nuclear power station.

SUMMARY OF THE INVENTION

It is accordingly an object of the invention to provide an apparatus for the recombination of hydrogen in a gas mixture that overcomes the above-mentioned disadvantages of the prior art devices of this general type, in which apparatus unintentional ignition of the gas mixture is avoided in a particularly reliable way.

With the foregoing and other objects in view there is provided, in accordance with the invention, an apparatus for a recombination of hydrogen in a gas mixture, including a housing; a catalyst configuration disposed in the housing and through which a gas mixture can flow by free convection in an operating situation; and a flame retention device associated with the catalyst configuration and having a number of inflow orifices formed therein for an inflow of the gas mixture and the inflow orifices having an average size of at least 0.2 mm and of at most 3 mm.

For an apparatus of the above-mentioned type, the object is achieved, according to the invention, in that the associated catalyst configuration, which is disposed in the housing through which the gas mixture can flow by free convection in the operating situation, is assigned the flame retention device. The flame retention device has a number of inflow orifices provided for the inflow of the gas mixture and have an average size of more than 0.2 mm and at most 3 mm.

The terminology "free convection", in particular, means that a local increase in temperature of the gas mixture, the increase resulting from the recombination of hydrogen in the vicinity of the catalyst configuration, results in a lift which overcompensates the pressure loss in the recombination apparatus in such a way, that the flow of the gas mixture through the recombination apparatus is ensured without external drive devices. In this case, the housing is configured in the manner of an approximately vertically disposed well, so that, in the operating situation, a chimney effect occurs so as to assist the flow of the gas mixture.

The dimensioning of the inflow orifices ensures the functioning of the flame retention device, and that particles of smaller sizes, such as, for example, aerosols, are capable of penetrating freely. The risk of clogging by small particles, such as, for example, aerosols, is thus reliably avoided. The pressure loss relevant for the flow behavior of the gas mixture through the recombination apparatus therefore remains particularly low, even after a lengthy period of operation. Moreover, with dimensioning of this kind, in combination with a suitably selected onflow surface, it is possible to configure the recombination apparatus for a particularly favorable flow velocity of the inflowing gas mixture with a view to the hydrogen recombination rate.

The invention proceeds from the knowledge that unintentional ignition of the gas mixture in the vicinity of the recombination apparatus could be triggered by a flame generated during recombination and emerging from the latter. In order to avoid this in a reliable way, the interior of the recombination apparatus, the interior being enclosed by the housing, should be uncoupled in terms of explosion from the space outside the recombination apparatus. A flame retention device is provided for this purpose. In this case, the flame retention device should be disposed in such a way that, in particular, flame propagation opposite to the direction of flow of the gas mixture is reliably prevented.

The flame retention device may be configured as a perforated plate or grid surrounding the housing completely or partially. The flame retention device preferably precedes the catalyst configuration.

In order to avoid unintentional ignition of the gas mixture surrounding the recombination apparatus in a particularly reliable way, the catalyst configuration is advantageously preceded by a sediment trap.

As emerged surprisingly in this regard, even so-called "stray" hot catalyst particles may contribute to ignition of the gas mixture surrounding the recombinator apparatus. When the recombination apparatus is in operation or even shut down, particles may be detached from the catalyst configuration. These detached catalyst particles may have a high temperature due to the heat released during the recombination of the hydrogen and may thus cause ignition when they enter an ignitable gas mixture, for example in the vicinity of the recombination apparatus. In order to avoid ignition of this kind caused by stray catalyst particles discharged from the recombination apparatus, the sediment trap is provided. In this case, the sediment trap is expediently integrated into the flame retention device.

In order, in a particularly reliable way, to prevent the gas mixture which surrounds the recombination apparatus from being ignited by stray hot catalyst particles, the sediment trap can advantageously be cooled by the gas mixture flowing into the housing. This ensures that an incandescent catalyst particle impinging on the sediment trap is cooled immediately and reliably in a particularly simple way.

Expediently, the housing of the recombination apparatus has a housing roof above an outflow orifice for the gas mixture. A housing of well-like construction, which is particularly suitable for the gas mixture to flow through by free convection, can therefore also be used in combination with a spray system disposed overhead, without the possibility of drops acting directly on the catalyst configuration. Catalyst particles being washed out as a result of the direct action of drops on the catalyst configuration is therefore possible at most to an insignificant extent.

The average size of the inflow orifices is preferably at most 2 mm.

In order to reliably prevent ignition of the gas mixture outside of the recombination apparatus, a deflagration volume delimited by the catalyst configuration and by the flame retention device is, in relation to the volume of the recombinator well or well-like housing, preferably smaller than about 20% of the volume of the recombinator well. In this case, the deflagration volume advantageously limits a flame to a flame length of at most 0.3 m, or an average distance between the flame retention device and the catalyst configuration is at most 0.3 m.

In order to avoid coarse particles from being discharged from the recombination apparatus along with the gas mixture which is heated as a result of the recombination reaction, the catalyst configuration is preferably followed by a coarse-particle trap. In this case, the coarse-particle trap may be configured in such a way that, on the one hand, stray catalyst particles detached from the catalyst configuration are effectively prevented from being discharged from the recombination apparatus and, on the other hand, a mixing effect in the gas mixture flowing through occurs in the region of the coarse-particle trap for the purpose of homogenizing the temperature. In this case, the coarse-particle trap is dimensioned in such a way that particles of small size, such as, for example, atmospheric aerosols, can penetrate freely. Filtering of atmospheric aerosols is not necessary in this case, particularly because precipitation of the aerosols is largely avoided as a result of thermophoresis or temperature-induced repulsion at the catalyst configuration. The risk of clogging by the aerosols is thus reliably avoided, so that a pressure loss inhibiting free convection in the recombination apparatus remains low, even when the recombination apparatus operates for a lengthy period of time. The throughput of the gas mixture through the recombination apparatus is therefore not impaired, even in the case of a lengthy period of operation. For this purpose, the coarse-particle trap advantageously has a number of passage orifices with an average gap width of at least 0.1 mm, preferably of at least 0.2 mm, and of at most 1 mm. In this case, the coarse-particle trap may be configured as a single-layer screen plate or else as a multi-layer screen or fiber configuration or as a combination of the two.

In order to limit the surface temperature of the recombination apparatus to a range well below the ignition temperature of the gas mixture surrounding the recombination apparatus, the housing advantageously has an insulating jacket. In this case, an air gap or else a temperature-resistant and radiation-resistant insulating material may be provided in the manner of a double-jacket configuration. Moreover, to reduce heat transmission by radiation, the inner surface of the housing may be metallized. In this case, the inner surface may be ground in such a way as to produce a three-dimensional mirror effect which keeps the relevant transport of heat by radiation low, particularly in a temperature range of more than 500° C.

For cooling the gas mixture emerging from the recombination apparatus to a temperature well below the ignition temperature of the gas mixture surrounding the recombination apparatus, the catalyst configuration is expediently followed by an admixing stage for admixing ambient atmosphere to the gas mixture emerging from the catalyst configuration. In this case, the admixing stage is expediently disposed downstream of the coarse-particle trap in the direction of flow. In this case, for admixing, a number of slit orifices is preferably provided in the housing for supplying ambient atmosphere to the gas mixture flowing within the housing.

In order, in a particularly reliable way, to avoid the gas mixture which surrounds the recombination apparatus from being ignited unintentionally, the recombination apparatus is expediently configured in such a way that the gas mixture flowing out of the catalyst configuration, heated as a result of the recombination of hydrogen, has a temperature below the ignition temperature of the gas mixture surrounding the recombination apparatus. For this purpose, the catalyst configuration is advantageously followed by a static mixer that brings about a homogenization or equalization of the temperature of the gas mixture flowing out of the catalyst configuration. In this case, parts of the gas mixture which are locally heated to a particularly high temperature are mixed with parts of the gas mixture which are locally heated to a particularly low temperature, so that high maximum temperatures are avoided.

For particularly effective recombination of the hydrogen carried in the gas mixture, the catalyst configuration advantageously has platinum and/or palladium as a catalytically active material. The catalyst configuration expediently contains a number of approximately plate shaped catalyst bodies, in each case two adjacent catalyst bodies are disposed at an average distance from one another of at least 0.8 cm and of at most 3 cm. In this case, for a high recombination rate along with a low volume, each catalyst body is advantageously coated with catalyst material on both sides, to form reaction surfaces, the gas mixture being capable of being conducted both over the front and over the rear reaction surface of each catalyst body.

The catalyst bodies are expediently held in a joint holding device. The recombination apparatus can therefore be produced at a particularly low outlay in terms of assembly and installation. In this case, the holding device advantageously has good thermal conductivity, so as to ensure in a particularly simple way that the temperature in the region of the catalyst configuration is equalized.

So that the temperature of the gas mixture flowing out of the catalyst configuration is kept in a particularly reliable way below the ignition temperature of the gas mixture surrounding the recombination apparatus, the catalyst configuration is advantageously configured for oxidation of only a fraction of the hydrogen carried in the gas mixture, preferably for oxidation of a fraction of the hydrogen carried in the gas mixture of less than 70%, preferably less than 50%.

A particularly reliable convection flow within the recombination apparatus can be achieved in that the housing advantageously has, in the direction of flow of the gas mixture, a length of at least 0.4 m, preferably of at least 1 m, and of at most 2 m.

The advantages afforded by the invention are, in particular, that, by use of the flame retention device preceding the catalyst configuration, the propagation of a flame, occurring as a result of the heat released during the recombination of hydrogen, into a spatial region outside the recombination apparatus is reliably avoided. In this case, by suitably dimensioning the flame retention device, it is possible to configure the recombination apparatus for a particularly low pressure loss, so that the recombination apparatus can be operated by free convection and therefore by simple measures. Moreover, by virtue of the sediment trap expediently preceding the catalyst configuration and advantageously integrated into the flame retention device, discharge of stray hot catalyst particles that become detached into the spatial region outside the recombination apparatus is reliably avoided. Flameless operation of the recombination apparatus in an ignitable atmosphere, with unintentional ignitions in the spatial region outside the recombination apparatus being avoided, is thus possible.

Other features which are considered as characteristic for the invention are set forth in the appended claims.

Although the invention is illustrated and described herein as embodied in an apparatus for the recombination of hydrogen in a gas mixture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
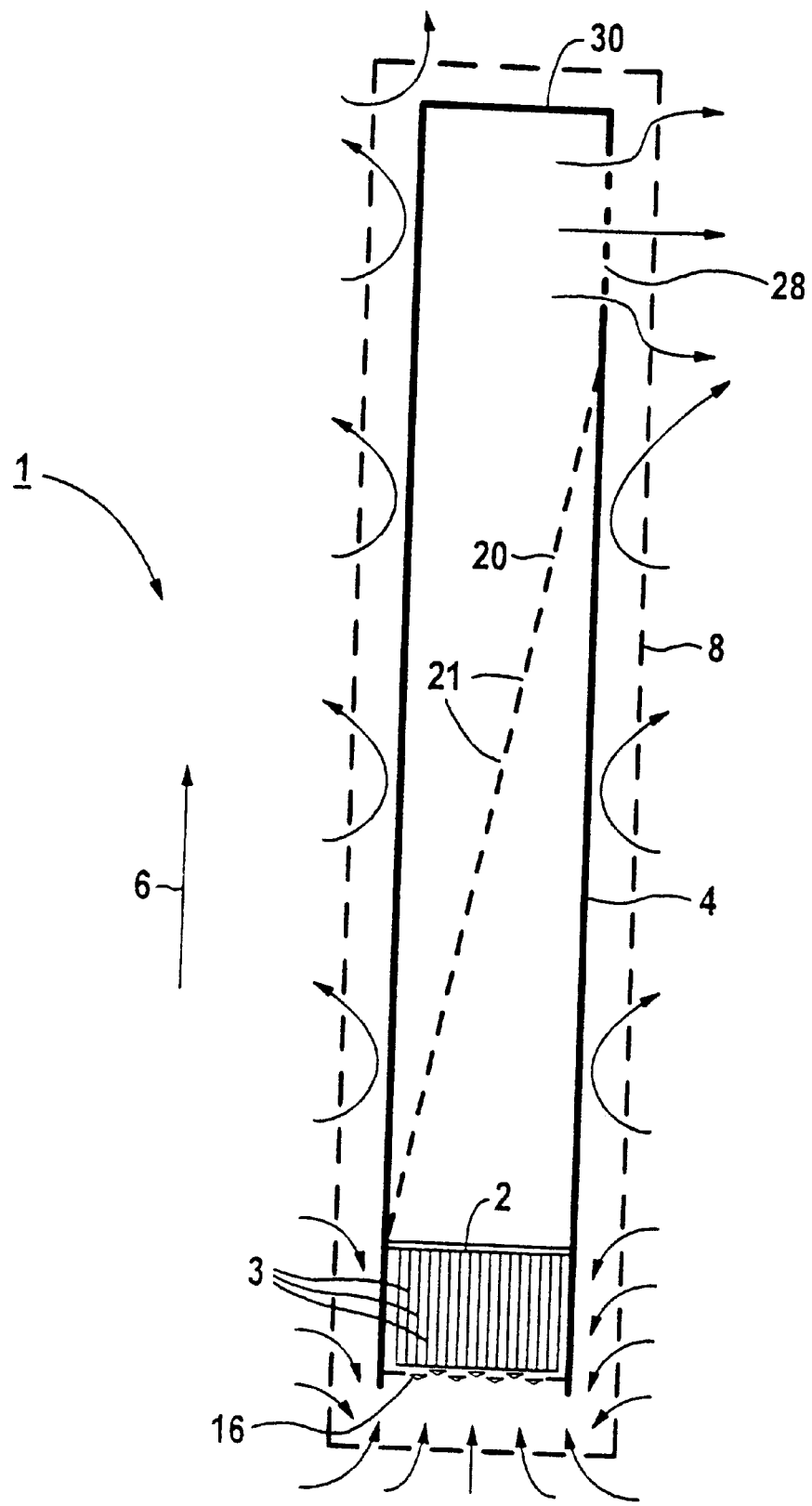
FIG. 1 a diagrammatic, sectional view of an apparatus for a recombination of hydrogen in a gas mixture according to the invention.

In all the figures of the drawing, sub-features and integral parts that correspond to one another bear the same reference symbol in each case. Referring now to the figures of the drawing in detail and first, particularly, to FIGS. 1 and 2 thereof, there is shown an apparatus 1 (FIG. 1) and an apparatus 1' (FIG. 2) which are each provided for the recombination of hydrogen in a gas mixture, namely in a containment atmosphere of a nuclear power station which is not illustrated in any more detail, in the event of an incident. For this purpose, the apparatus 1, 1' contains in each case a catalyst configuration 2, in which catalytically active material suitable for the recombination of hydrogen is attached to a carrier configuration in a way which is not illustrated in any more detail. In this case, in particular, a mixture of precious metals or else a configuration of precious-metal foils may be provided as a catalytically active material. In this case, in particular, platinum and/or palladium are provided as the precious metal.

The catalyst configuration 2 contains a number of approximately plate-shaped catalyst bodies 3 which are disposed approximately parallel to one another and at a distance of at least 0.8 cm and at most 3 cm from one another. In this case, the catalyst bodies 3 may be configured as solid plates or else as a loose filling in a plate-shaped carrying structure.

Each catalyst body 3 is coated with catalyst material on both sides, to form reaction surfaces, the gas mixture being capable of being conducted both over the front and over the rear reaction surface of each catalyst body 3. For particularly simple assembly, the catalyst bodies 3 are held in a joint holding device configured as a push-in rack and having high thermal conductivity.

The catalyst configuration 2 is disposed in a housing 4. In this case, the housing 4 is configured in such a way that, in the operating situation, the gas mixture can flow through the apparatus 1, 1' by free convection. For this purpose, the housing 4 forms a well in an essentially vertical preferred direction indicated by the arrow 6. When the apparatus 1, 1' is in the operating situation, the lift caused as a result of the generation of heat during the recombination of the gas mixture in the region of the catalyst configuration 2 brings about an overcompensation of the pressure drop for the gas mixture, so that a flow of the gas mixture through the apparatus 1, 1', without external auxiliary or drive devices, commences as a consequence of a chimney effect of the housing 4 of well-like configuration. In this case, the housing part of well-like configuration has a chimney height of between 0.5 m and 2.5 m for compensating the pressure losses caused. Moreover, for a particularly favorable convection behavior, the housing 4 expediently has a height-to-depth ratio of between 0.3 and 10.

The apparatus 1, 1' is configured in such a way that ignition of the ignitable gas mixture in the region outside the apparatus 1, 1' is reliably avoided, even at the high temperatures that occur as a result of the release of heat during the recombination of hydrogen in a region of the catalyst configuration 2. For this purpose, the catalyst configuration 2 is assigned a flame retention device 8. In the exemplary embodiment according to FIG. 1, the flame retention device 8 is configured as a wire grid completely enclosing the housing 4. Alternatively, a perforated plate may also be provided.

Figure 2:
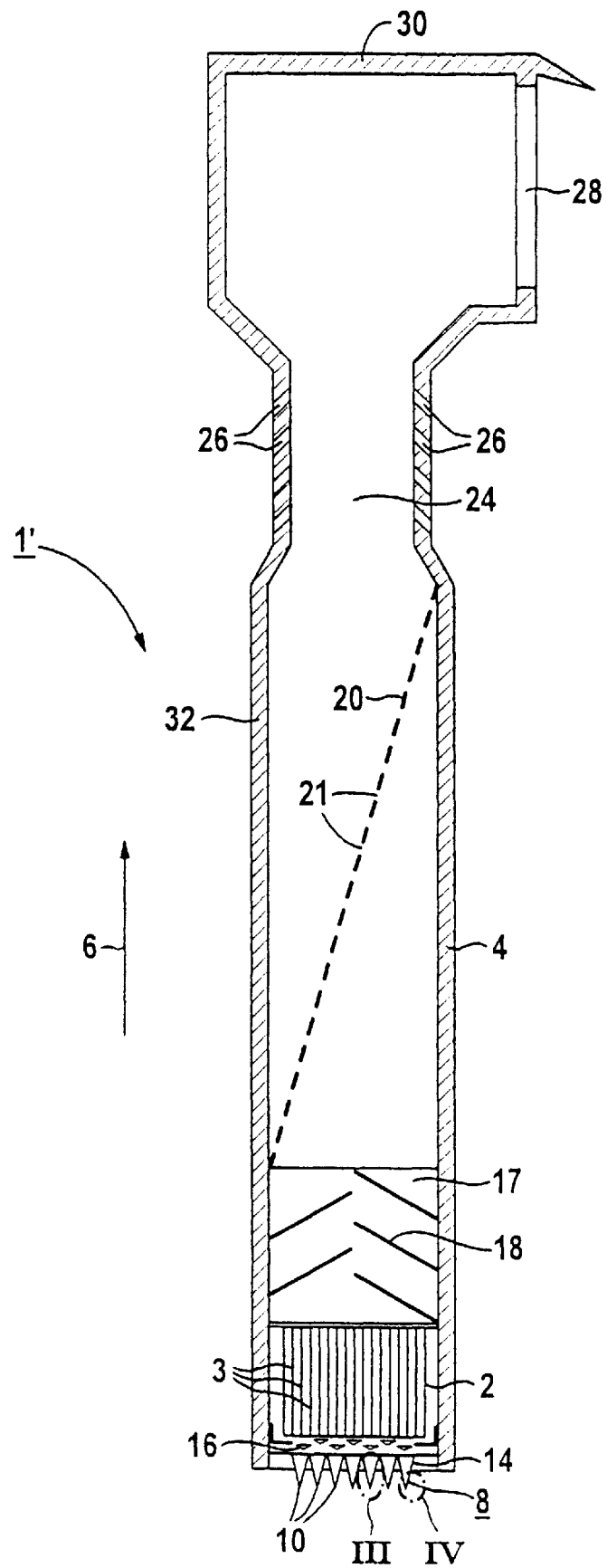
FIG. 2 is a sectional view of an alternative embodiment of the apparatus for the recombination of hydrogen in a gas mixture.

In the exemplary embodiment according to FIG. 2, the flame retention device 8 precedes the catalyst configuration 2. In this case, the flame retention device 8 is disposed upstream of the catalyst configuration 2 in the direction of flow, in such a way that its average distance from the catalyst configuration 2 is less than 0.3 m. The volume delimited by the catalyst configuration 2 and the flame retention device 8 thus limits a flame occurring there to a flame length of less than 0.3 m.

Figure 3:
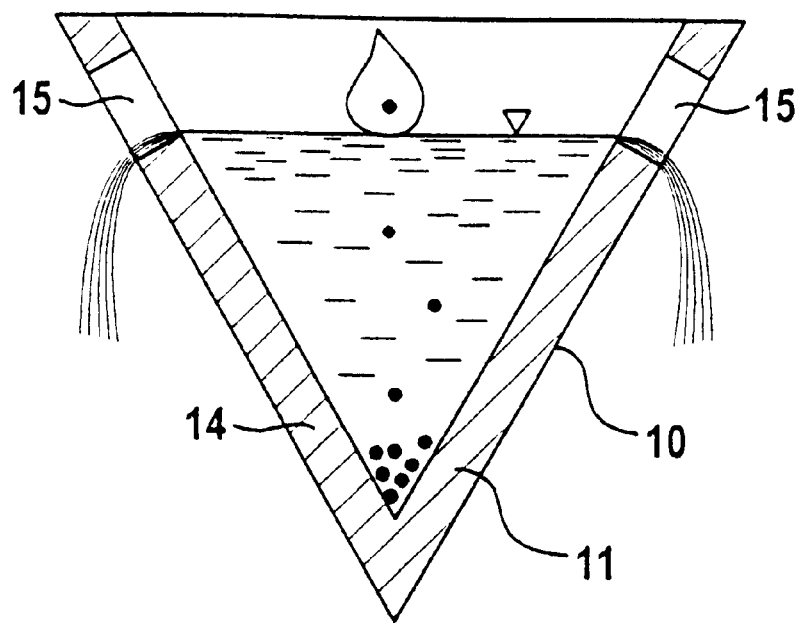
FIG. 3 is an enlarged, sectional view of detail III shown in FIG. 2.
Figure 4:
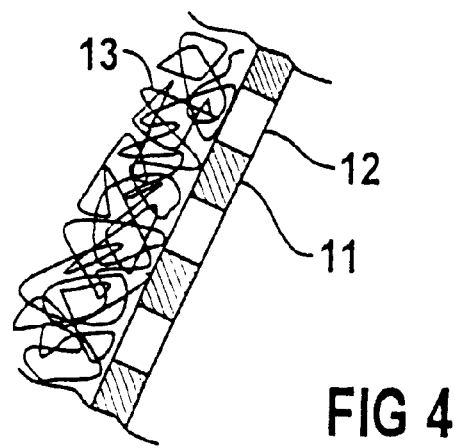
FIG. 4 is an enlarged, sectional view of detail IV shown in FIG. 2.

In the exemplary embodiment according to FIG. 2, the flame retention device 8 contains a number of flame filters 10, one of which is shown in FIG. 3. In the exemplary embodiment, each flame filter 10 is composed of a perforated metallic basic body 11 having a number of inflow orifices 12 for the gas mixture, as illustrated in the detail shown in FIG. 4. In this case, the basic body 11 is covered by a layer 13 of fibrous cloth, in particular of metal-fibre cloth. A flame filter 10 configured in this way also contributes, in addition, to a homogenizing of the gas mixture flowing through it.

The perforation of the metallic basic body 11 of each flame filter 10 may be, for example, of round, slotted or quadriform shaped. Alternatively, other shapes of the perforation are also possible. The summed relative free area of all the flame filters 10 which is defined by all the inflow orifices 12 is at least as large, advantageously approximately 1 to 3 times as large as the free inflow cross-section of the catalyst configuration 2.

For a particularly large surface of each flame filter 10, the respective basic body 11 is provided with various folds and/or bends, an approximately star-shaped cross-section being obtained. Furthermore, a gap width of the inflow orifices 12 provided by perforating the basic bodies 11 of the flame filters 10 is adapted to the expected configuration-related hydrogen concentration. For example, for uncoupling the interior of the apparatus 1' in terms of explosion from its surroundings in the case of a hydrogen concentration of up to 10% by volume, a gap width of at most 2 mm is provided. By contrast, in the case of a configuration-related hydrogen concentration of more than 10% by volume, a gap width of less than 1 mm is provided. Moreover, in this case, the gap width of the perforation of the metallic basic bodies 11 of the flame filters 10 is dimensioned in such a way that precipitation of colloids or aerosols on the flame filters 10 is largely avoided. Clogging of the apparatus 1' while it is in operation is thus reliably avoided.

As a further configuration criterion in the dimensioning of the gap width of the inflow orifices 12 provided in the metallic basic bodies 11 of the flame filters 10, it must be remembered that the pressure build-up within the housing 4 of the apparatus 1' in the event of ignition of the gas mixture present there should remain lower than about 100 hPa, so that the apparatus 1' will reliably avoid being put at risk. For this purpose, the gap width of the inflow orifices 12 in the metallic basic body 11 of the flame filters 10 is dimensioned in such a way that there is a sufficient relief cross-section in the event of such ignition.

In the exemplary embodiment according to FIG. 2, a sediment trap 14 is integrated into the flame retention device 8. For this purpose, each flame filter 10 is configured in such a way that particles, which, as illustrated diagrammatically in FIG. 3, pass directly or via a drop of liquid into the flame filter 10 having a V-shaped longitudinal section, are precipitated in the bottom region of the latter. Liquid that has possibly been precipitated in this case passes via outflow orifices 15 into a drainage system which is not illustrated in any more detail.

Furthermore, the sediment trap 14 contains a number of trap plates 16, one of which is disposed in each case above the inflow duct of each flame filter 10. Alternatively or additionally, the sediment trap 14 may also contain a wire netting disposed upstream of the catalyst configuration 2, as seen in the direction of flow of the gas mixture. The dimensioning of the sediment trap 14 with regard to the size of the particles to be trapped takes into account the known fact that, for physical reasons, primarily catalyst particles having a grain size of more than about 100 $\mu$m contribute to ignition of the gas mixture. Stray hot catalyst particles having a grain size greater than this, which become detached from the catalyst configuration 2, are reliably prevented from flowing out of the housing 4 counter to the direction of flow of the gas mixture by the sediment trap 14. The sediment trap 14 and the flame retention device 8 can be cooled by the gas mixture flowing into the housing 4.

The catalyst configuration 2 is dimensioned in such a way that, in the configuration-related situation, only a fraction of the hydrogen, which is carried in the gas mixture flowing into the apparatus 1, 1', of less than 50% is oxidized. The increase in temperature in the gas mixture, the increase resulting from the quantity of heat released as a result of oxidation, is therefore only limited. The temperature of the gas mixture emerging from the catalyst configuration 2 is therefore kept well below the ignition temperature of the atmosphere in the vicinity of the apparatus 1, 1'.

As illustrated in FIG. 2, in order to limit further a maximum temperature which occurs in the gas mixture, a static mixer 17 is disposed in the housing 4 downstream of the catalyst configuration 2 in the direction of flow of the gas mixture. In this case, the static mixer 17, which contains for example, a number of mixing plates 18, serves for intermixing or swirling the gas mixture flowing through. Such intermixing or swirling ensures that the temperature of the gas mixture is homogenized over the cross-section within the housing 4. In this case, zones within the gas mixture which are heated to a greater extent on account of their spatial proximity to the catalyst bodies are intermixed with zones of the gas mixture which are comparatively colder on account of their comparatively greater spatial distance from the catalyst bodies 3. This achieves an effective reduction in temperature of the regions within the gas mixture which are heated to the greatest extent, so as to fall short reliably of predeterminable temperature limit values for the gas mixture.

Within the housing 4, the catalyst configuration 2 is followed by a coarse-particle trap 20. In this case, the coarse-particle trap 20, which, in the exemplary embodiment according to FIG. 2, follows the static mixer 17, is composed of a netting of thin wires in the exemplary embodiment. The netting forms passage orifices 21, the mesh width of the wire cloth being selected smaller than 800 $\mu$m, taking into account the pressure loss of the apparatus 1, 1' and the precipitation capacity required. Moreover, a further configuration criterion taken into account in dimensioning the mesh width is that no precipitation of colloids or aerosols should take place at the coarse-particle trap 20. On the contrary, the coarse particle trap 20 is dimensioned in such a way that aerosols or colloids can penetrate quantitatively and without appreciable precipitation losses. The risk of clogging due to aerosols or colloids that are precipitated is thus reliably avoided. The throughput through the apparatus 1, 1' is therefore not appreciably influenced, even in the case of a lengthy period of operation. In this case, the mesh width of the coarse-particle trap 20 is more than 0.1 mm, in particular 0.2 mm to 0.8 mm. Alternatively, the coarse-particle trap 20 may also contains a succession of a plurality of coarse-mesh wire nettings. In this case, the mesh width of each wire netting may also be selected greater than 1 mm.

The coarse-particle trap 20 and therefore also the catalyst configuration 2 are followed by an admixing stage 24 for admixing ambient atmosphere to the gas mixture emerging from the catalyst configuration 2. For this purpose, the housing 4 has a number of slit orifices 26 in the region of the admixing stage 24. By admixing ambient atmosphere to the gas mixture emerging from the catalyst configuration 2, the temperature of the gas mixture can be reliably lowered to a value below the ignition temperature of the ambient atmosphere.

An outflow orifice 28 for the gas mixture is provided in the end region of the housing 4 of the apparatus 1, 1'. In this case, the outflow orifice 28 is disposed laterally in the housing 4, so that, with the apparatus 1, 1' being disposed approximately vertically, the gas mixture flows out in an approximately horizontal direction. Above the outflow orifice 28, the housing 4 is provided with a housing roof 30. In this case, the housing roof 30 serves as a drop-repelling delimitation for the apparatus 1, 1', so that, even if a spray system is in operation above the apparatus 1, 1', a direct infiltration of liquid drops into the apparatus 1, 1' is avoided. This reliably avoids catalyst particles being washed out of the catalyst configuration 2, even when a spray system of this type is used.

In the exemplary embodiment according to FIG. 2, the housing 4 has an insulating jacket 32. In the exemplary embodiment, the insulating jacket 32 is configured as an air gap in the manner of a double-jacket construction. Alternatively, a temperature-resistant and radiation-resistant insulating material disposed between two jacket layers may also be provided. In order to reduce the transmission of heat by radiation from the inner region of the housing 4 to its outer region, the surface of the inside of the insulating jacket 32 is ground in such a way as to produce a mirror effect. Emergence of radiation through the insulating jacket 32 is thus reliably avoided. By virtue of this construction of the insulating jacket 32, the transport of heat by radiation, the transport being relevant in a temperature range of more than 500° C., is in particular prevented to a great extent. The apparatus 1', provided with the insulating jacket 32 of this type, when operating in a configuration-related situation, has an outside temperature of its housing that is well below 500° C. This reliably avoids the gas mixture that surrounds the housing 4 being ignited on account of a high housing outside temperature.

We claim:

1. An apparatus for a recombination of hydrogen in a gas mixture, comprising:
   a housing;
   a catalyst configuration, for effecting a recombination of hydrogen in a gas mixture, disposed in said housing and through which said gas mixture can flow by free convection in an operating situation; and
   a device within 0.3 m of said catalyst configuration having a number of inflow orifices having an average size of at least 0.2 mm and of at most 3 mm for an inflow of said gas mixture and flame retention.

2. The apparatus according to claim 1, wherein said device precedes said catalyst configuration.

3. The apparatus according to claim 1, including a sediment trap preceding said catalyst configuration.

4. The apparatus according to claim 3, wherein said sediment trap is integrated into said device.

5. The apparatus according to claim 3, wherein said sediment trap is cooled by the gas mixture flowing into said housing.

6. The apparatus according to claim 1, wherein said housing has an outflow orifice formed therein for the gas mixture and a housing roof disposed above said outflow orifice.

7. The apparatus according to claim 1, wherein said inflow orifices each have an average size of at most 2 mm.

8. The apparatus according to claim 1, wherein a volume delimited by said catalyst configuration and by said device limits a flame to a flame length of at most 0.3 m.

9. The apparatus according to claim 1, wherein an average distance between said device and said catalyst configuration is at most 0.3 m.

10. The apparatus according to claim 1, including a coarse-particle trap disposed downstream of said catalyst configuration.

11. The apparatus according to claim 10, wherein said coarse-particle trap has a number of passage orifices formed therein with an average gap width of at least 0.1 mm and of at most 1 mm.

12. The apparatus according to claim 10, wherein said coarse-particle trap has a number of passage orifices formed therein with an average gap width of approximately 0.2 mm.

13. The apparatus according to claim 1, wherein said housing has an insulating jacket.

14. The apparatus according to claim 1, including an admixing stage disposed downstream of said catalyst configuration for admixing ambient atmosphere to the gas mixture emerging from said catalyst configuration.

15. The apparatus according to claim 1, including a static mixer disposed downstream of said catalyst configuration.

16. The apparatus according to claim 1, wherein said catalyst configuration has at least one of platinum and palladium as a catalytically active material.

17. The apparatus according to claim 1, wherein said catalyst configuration contains a number of approximately plate-shaped catalyst bodies, and in each case two adjacent plate-shaped catalyst bodies are disposed at an average distance from one another of at least 0.8 cm and of at most 3 cm.

18. The apparatus according to claim 17, including a coating having a catalyst material covering both sides of each of said plate-shaped catalyst bodies forming a front reaction surface and a rear reaction surface on said plate-shaped catalyst bodies, the gas mixture being capable of being conducted over both said front reaction surface and said rear reaction surface of said plate-shaped catalyst bodies.

19. The apparatus according to claim 1, wherein said catalyst configuration is configured for oxidation of only a fraction of hydrogen carried in the gas mixture.

20. The apparatus according to claim 19, wherein said catalyst configuration is configured for oxidation of a fraction of the hydrogen carried in the gas mixture of less than 50%.

21. The apparatus according to claim 1, wherein said housing has a length in a direction of flow of the gas mixture of at least 0.4 m and of at most 2 m.

22. The apparatus according to claim 21, wherein said length of said housing in the direction of flow of the gas mixture is approximately 1 m.

* * * * *